Patented Aug. 17, 1926.

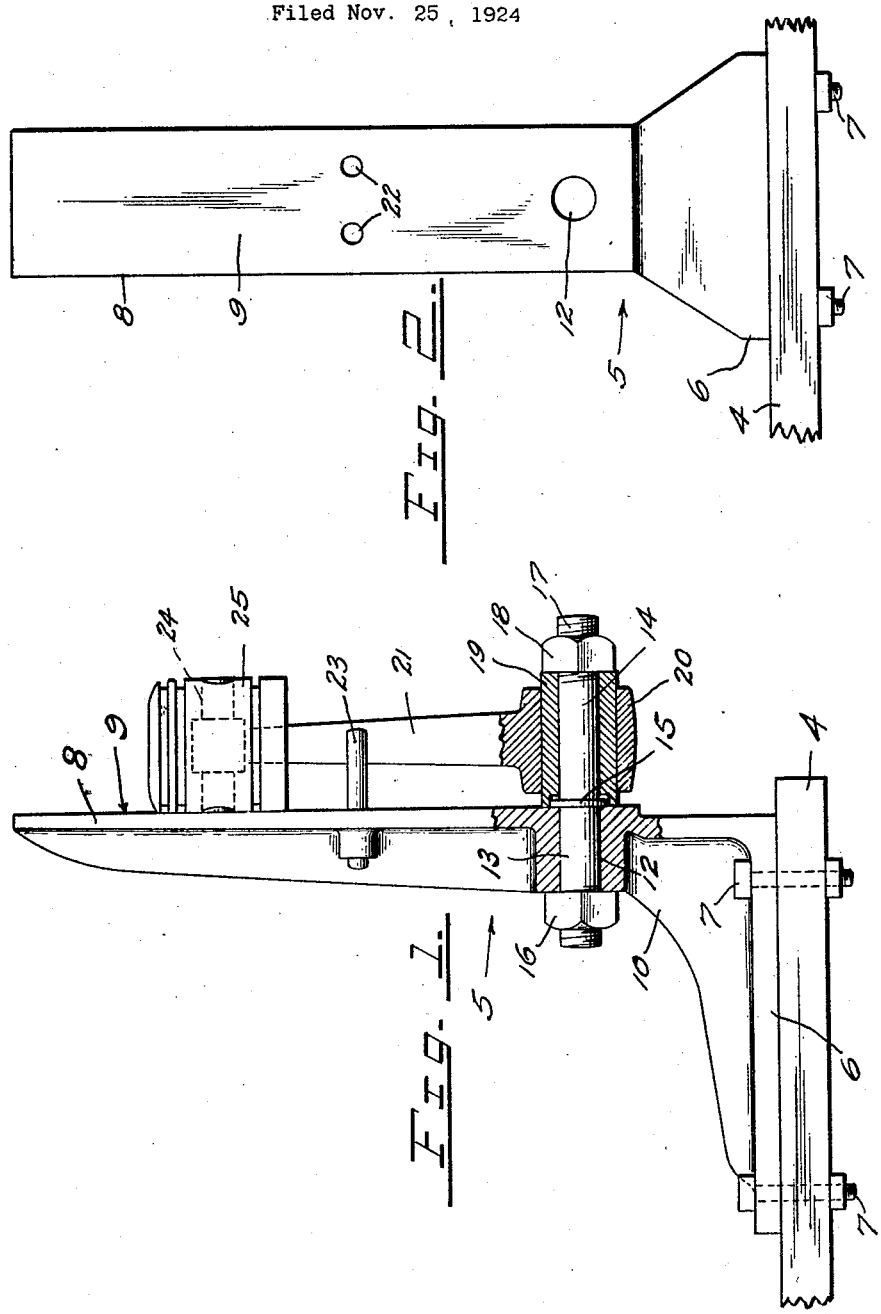

1,596,427

UNITED STATES PATENT OFFICE.

NED E. GOUGH, OF SEATTLE, WASHINGTON.

PISTON AND CONNECTING-ROD ALIGNING JIG.

Application filed November 25, 1924. Serial No. 752,248.

This invention relates to jigs for aligning pistons and connecting-rods of internal combustion engines.

The object of my invention, generally, is the provision of an inexpensively constructed device of this character whereby the work may be tested and regulated in a more effective and rapid manner.

More specific objects and advantages of the invention will appear in the following description.

The invention consists in the novel construction, adaptation and combination of parts hereinafter described and claimed.

In the accompanying drawings,—

Figure 1 is a side elevation, partly in section, of apparatus embodying my invention, with a piston and its connecting rod applied; and Fig. 2 is a front elevation of the frame member of the same.

In said drawing, the reference numeral 5 represents an angular shaped frame having a base 6 adapted to be seated upon and rigidly secured to a bench 4 or other support as by means of bolts 7. Extending upwardly from an end of said base and in right angular relation thereto is a standard 8 having a plane front surface 9, hereinafter designated as the face.

For rigidity and strength the frame is provided desirably with a reinforcement web 10. At or about the midwidth of its lower portion and within the area of the face 9, the standard 8 is provided with a bore 12 at right angles to said face to receive the stub portion 13 (Fig. 1) of a mandrel 14 which protrudes from said face. As illustrated, the mandrel is formed to provide a collar element 15 which cooperates with a nut 16 which is threaded upon the mandrel stub for securing the mandrel to the standard.

The outer end of said mandrel is screw threaded as at 17 for a nut 18 whereby a sleeve such as 19 having its inner end in a plane at right angles to its axis is detachably secured to the mandrel.

In practice, there would be employed a plurality of sleeves of different external diameters to fit within the bearings at the crank ends, such as 20, for example, of a connecting rod 21. However, instead of employing a sleeve and a mandrel, as above explained and illustrated in Fig. 1, the sleeve may be omitted and the mandrel itself used directly within the bearing at the crank end of a connecting rod, which arrangement is especially adapted for use in shops wherein connecting rod bearings operated upon are of the same diameter.

Located in the standard 8 above the bore 12 is a pair of holes 22, Fig. 2, for the reception of pins such as 23 which are spaced horizontally to receive therebetween the connecting rod 21.

The pins 23 are, however, shiftable axially to protrude more or less from the plane face 9 of the standard out of and into engageable relation with the connecting rod to enable the latter being swung about the mandrel 14, when testing the rod, or retain the rod in a substantially vertical position when testing a piston 25 which is connected to said rod by means of a wrist pin 24.

In operation, the work, consisting of a connecting rod 21 and the associated piston 25, is applied as shown in Fig. 1 with the crank end of the rod mounted upon the mandrel or, as illustrated, upon the sleeve 19. With the pins 23 in their retracted positions the work is then swung from side to side about the axis of the mandrel to determine if the connecting rod bearing is itself cylindrical. Should the bearing be irregular, the work is removed from the sleeve and a chalk or an equivalent marking material is applied to the peripheral surface of the sleeve, whereupon the work is remounted upon the sleeve and when turned, the connecting rod bearing is marked to indicate where the bearing has to be scraped or otherwise treated in order to produce the requisite fit.

After the rod bearing is found to be true, the pins 23 are disposed in positions to engage the rod 21, whereupon the work is again mounted upon the mandrel sleeve and held as in a substantially vertical position, as shown in Fig. 1, between the pins 23. When thus arranged if a contact occurs between the face 9 and the piston 25 throughout the length of the latter the alignment of the axes of the piston and rod is correct, otherwise the connecting rod must be straightened by bending the same at right angles to the axes of the mandrel 14 to effect the correction. After such alignment has been accomplished, with the rod bearing on the mandrel sleeve and the rod 21 between the pins 23, the operator rotatably moves the piston with respect to the wrist pin 24. If the piston is cylindrical and in its various oscillatory positions contacts throughout its length with the face 9 the axes of the bearings of the piston rod and wrist pin 24 are parallel, if such contacts do not appear the defect may usually be rectified by imparting a torsional twist to the rod.

If the piston be tapered or of a conoidal shape, as customary with some makes of high speed engines, the end of a thin gage strip—say, three one-thousandth of an inch thick—is inserted between the periphery of the piston at its smaller end and the surface 9 of the standard. In testing the piston whether cylindrical or tapering the pins 23 are utilized to maintain the connecting rod 21 in position to present the piston to the standard surface thereby permitting the use of both hands of the operator for work.

The bending and twisting operations above referred to may be performed by means of a wrench of known construction while the work is mounted upon the jig.

What I claim, is,—

1. In apparatus of the character described a standard having a front plane face, said standard having within the area of said plane face a bore adjacent to its lower end and a pair of horizontally spaced apart apertures at approximately the mid-height of said face, a mandrel having an end thereof fitted within said bore said mandrel end having a screw threaded extremity protruding from the rear of the standard, a nut engaging the screw threads of the mandrel for securing the latter to the standard, said mandrel being adapted to receive thereon the bearing of a connecting-rod carrying a piston for testing the same with respect to said face, and pins mounted for endwise movement in the respective apertures and arranged to be protruded from the plane face of the standard into positions to be engaged by the connecting-rod for retaining the latter in a substantially vertical position.

2. In apparatus as defined in claim 1, wherein the mandrel is provided at its mid-length to engage against the plane face of the standard and to cooperate with the nut for securing the mandrel against axial movement in either direction, a sleeve bushing to receive a connecting-rod bearing, said bushing being mounted upon the mandrel in front of the plane face of the standard, and means secured to the front outer end of the mandrel and acting against the bushing for holding the same upon the mandrel and against said plane face.

Signed at Seattle, Washington, this 17th day of November 1924.

NED E. GOUGH.